United States Patent [19]

Ryf

[11] Patent Number: 4,830,552

[45] Date of Patent: May 16, 1989

[54] DEVICE FOR ENGRAVING INTAGLIO PRINTING CYLINDERS

[75] Inventor: Rudolf Ryf, Bannwil, Switzerland

[73] Assignee: MDC Max Datwyler Bleienbach AG, Bleienbach, Switzerland

[21] Appl. No.: 104,044

[22] Filed: Oct. 1, 1987

[30] Foreign Application Priority Data

Oct. 2, 1986 [CH] Switzerland ........................ 03940/86

[51] Int. Cl.[4] .................................................. B23C 1/18

[52] U.S. Cl. ...................................................... 409/103

[58] Field of Search ............... 409/93, 98, 105; 72/76, 72/81

[56] References Cited

U.S. PATENT DOCUMENTS

| | | | |
|---|---|---|---|
| 711,273 | 10/1902 | Avril | 409/98 |
| 1,695,617 | 12/1928 | Teissere | 72/81 X |
| 3,339,279 | 9/1967 | Sovar et al. . | |

FOREIGN PATENT DOCUMENTS

| | | | |
|---|---|---|---|
| 542897 | 12/1955 | Belgium . | |
| 2307095 | 8/1974 | Fed. Rep. of Germany . | |
| 2336089 | 2/1975 | Fed. Rep. of Germany . | |
| 3619320 | 3/1987 | Fed. Rep. of Germany . | |
| 996173 | 2/1983 | U.S.S.R. | 409/98 |
| 458112 | 12/1936 | United Kingdom . | |
| 552415 | 4/1943 | United Kingdom | 409/98 |
| 1542556 | 3/1979 | United Kingdom . | |

*Primary Examiner*—Eugene F. Desmond

*Attorney, Agent, or Firm*—Collard, Roe & Galgano

[57] ABSTRACT

A device for engraving intaglio printing cylinders is provided having the engraving needle cutting the small screen cups in the intaglio printing cylinder and the scanning element applied to the cylinder jointly supported in a holding device. The scanning element is engaged by a damping element having a piston supported on a pressure spring and guided in a cylindrical casing. A tappet is connected to the piston and engages the scanning element or a handwheel mounted on such element. Motions of the scanning element in the direction of its longitudinal axis are damped by the damping element thereby eliminating undesirable vibrations of the holding device and thus of the engraving needle.

14 Claims, 4 Drawing Sheets

DEVICE FOR ENGRAVING INTAGLIO PRINTING CYLINDERS

The present invention relates generally to a device for the engraving of intaglio printing cylinders and similar printing plates. More particularly, the present invention relates to such a device having at least one engraving tool which, together with a scanning element, is supported by a holding device and adapted to be brought into contact with the printing plate to be engraved It is well known in the engraving of intaglio printing cylinders to use so-called "clichégraphs", which have one or a plurality of engraving heads arranged one next to the other parallel to the longitudinal axis of the printing cylinder. Each engraving head has an engraving needle and a scanner, which are supported in a common holding device. The holder can be adjusted with respect to the printing cylinder in order that the scanner can be applied to the printing cylinder with a certain pressure.

The up-and-down motion of the engraving needle is produced by a control signal, which is derived from a video signal obtained by scanning a master. A scanning frequency, which sets the width of the screen, is superimposed on this control signal. The continuously oscillating engraving needle lowers itself into the surface of the intaglio printing cylinder in accordance with this control signal and cuts out small cups in the screen, which, with respect to their depth and surface size, vary in accordance with the tone value.

It has been found that a pattern of streaks sometimes becomes visible in products which are printed with printing cylinders engraved with such clichégraphs, such streak patterns consisting of streaks having different color values. Viewed in relation to the printing cylinder, such streaks run in the direction of the longitudinal axis of the printing cylinder and in the trade, this phenomenon is known as "louver effect". This pattern of streaks is caused by periodically occurring unevenness in the surface of the cylinder, that is, by deviations of the cylinder jacket from a geometrically exact shape, which influence the cutting and thus the formation of the small cups in the screen.

It is the object of the present invention to provide an engraving device of the type specified above, whereby the interference caused by unevenness in the surface of the printing cylinder can be substantially prevented from affecting the engraving of the printing cylinder, in a manner as simple as possible.

The above object is accomplished in accordance with the present invention by providing a damping system for the scanning element in an engraving device for intaglio printing cylinders having an engraving tool supported in a holder together with the scanning element which is adapted to be applied to the printing plate to be engraved It has been found that the scanning element applied to the printing cylinder under a certain pressure and following the uneven areas in the surface of the printing cylinder is caused to vibrate, and that such vibrations are transmitted to the holding device, causing the latter to oscillate, also. The vibrations of the holding device are transmitted to the engraving tool, which influences its controlled oscillatory motion, which has a bearing on the cutting action and the shaping of the small cups in the screen. By making provision for a damping system, which directly engages the scanning element or an element fastened on the latter, the motions of the scanning element caused by uneven areas of the printing cylinder are damped out for the most part. In this way, the holding device and the engraving tool are effectively prevented from vibrating and thus adversely affecting the engraving process.

An engraving device for the engraving of printing cylinders is known from Belgium Pat. No. 542,897, wherein the engraving needles are driven translationally by exciting electromagnets by means of control pulses. At their ends opposite the engraving tips, the engraving needles are supported on pressure springs, which determine the pressure at which the engraving needles are applied to the printing cylinder when the electromagnets are in the excited state. The support elements resting against the surface of the jacket of the printing cylinder are fastened on a mounting support without interconnection of a damping system, such mounting support being the support for the engraving needles and the electromagnets as well.

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views FIG. 1 is a schematic side elevational view partly in cross-section of the most important components of an engraving device incorporating the present invention;

Figure 1:
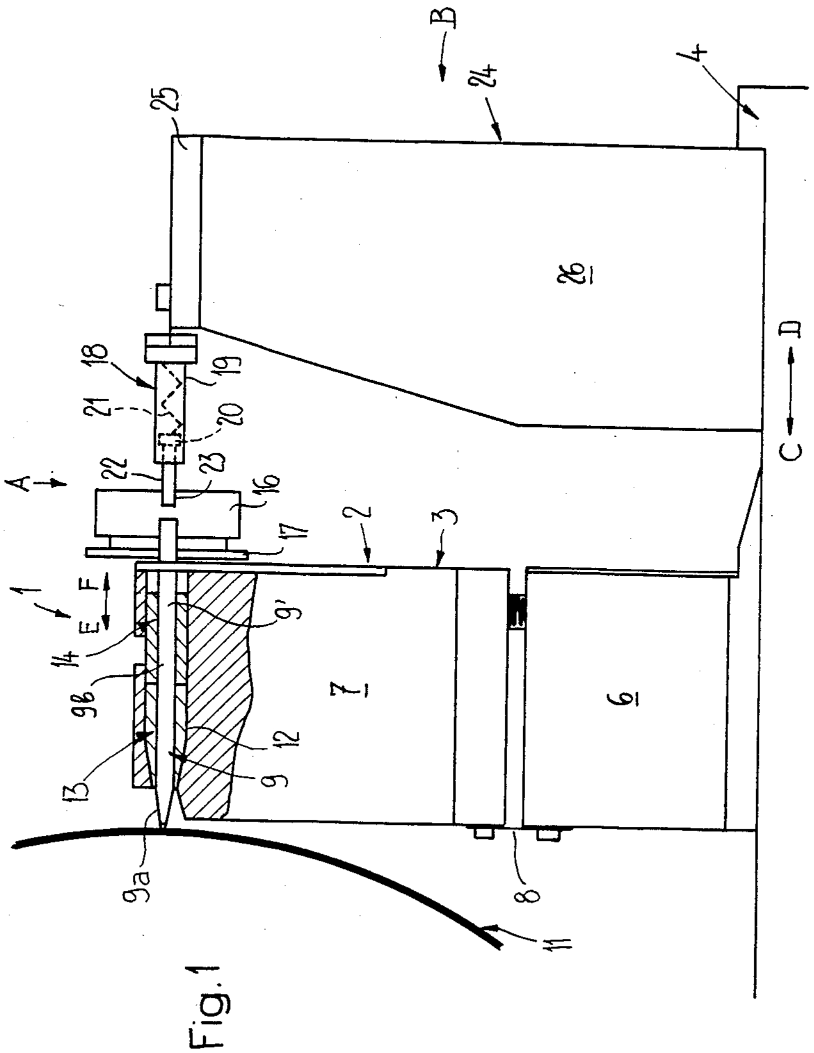
Figure 2:
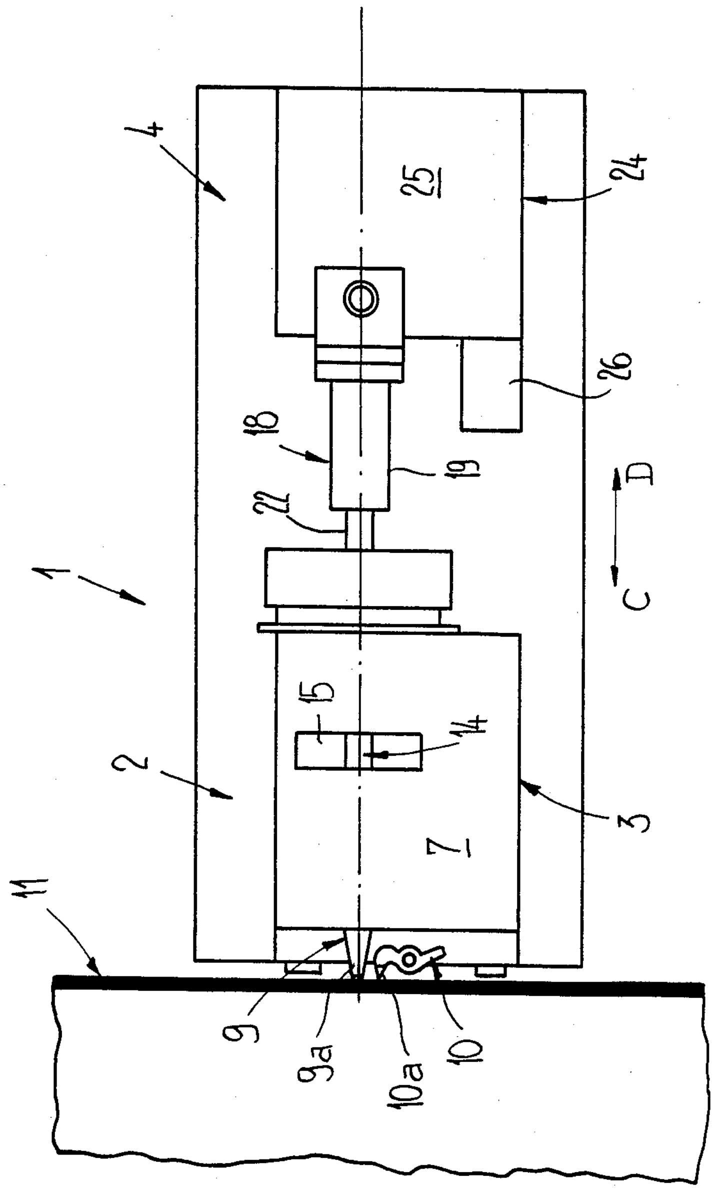
FIG. 2 is a schematic top plan view of the engraving device according to FIG. 1 as seen in the direction of arrow A of FIG. 1.
Figure 3:
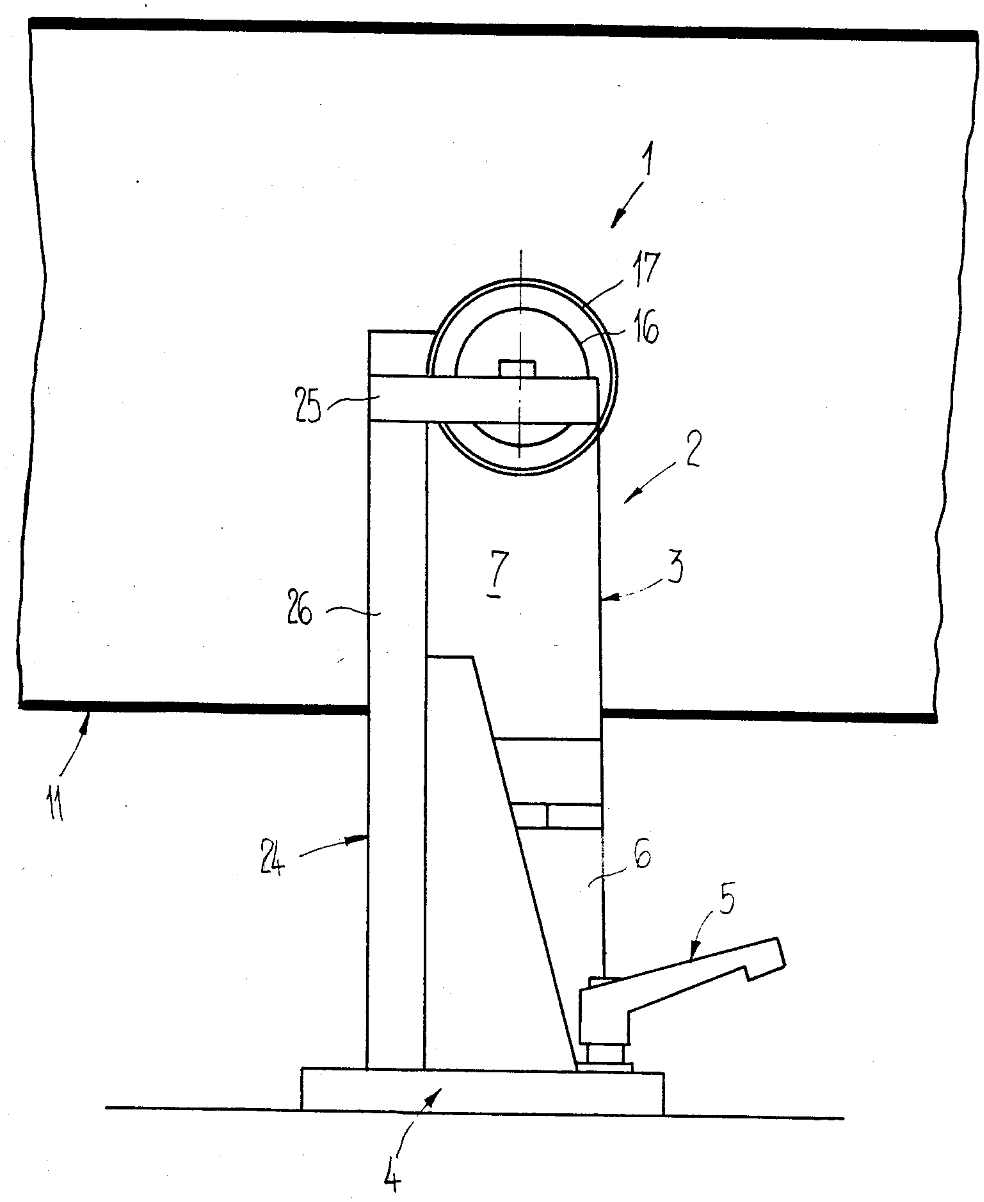
FIG. 3 is an elevational front view of the engraving device according to FIG. 1 as seen in the direction of arrow B of FIG. 1.

Now turning to the drawings, the clichégraph 1 shown in FIGS. 1 to 3 has a plurality of engraving heads 2 of known design, of which, however, only one head is shown in each of the figures. Engraving head 2 is secured on a carriage 4, which can be moved in the direction indicated by the arrows C and D. For arresting carriage 4, provision is made for a clamping device 5 disposed thereon and which is schematically shown in FIG. 3. The holding device, designated 3, consists of a base 6 and an upper part 7. Base 6 is mounted on carriage 4 and connected with upper part 7 by leaf springs 8 (see FIG. 1). In this way, upper part 7 of the holding device can be swivelled around an axis determined by leaf springs 8 and extending at right angles relative to the direction of displacement C, D of carriage 4, such swivelling motion taking place against base 6 of the holding device.

An elongated scanning element 9 is supported in upper part 7 of the holding device with its tip 9*a* projecting therefrom. Next to scanning element 9, an engraving needle 10 is supported in upper part 7 of the holding device having a cutting tip 10*a*. Engraving needle 10 performs, in a manner known per se, an up-and-down motion not shown in detail.

By displacing carriage 4 in the direction of arrow C and tilting upper part 7 about the afore-mentioned axis fixed by leaf springs 8, upper part 7 of holding device 3 is moved against the intaglio printing cylinder 11 to be engraved, until scanning element 9 comes to rest with its tip 9*a* against the surface of printing cylinder 11 with a certain pressure. As clearly seen in FIG. 1, scanning element 9 extends through a passage bore 12 formed in upper part 7. A clamping sleeve 13 surrounding shaft 9*b* of scanning element 9 is seated in passage bore 12. Sleeve 13 is conically tapered towards tip 9*a* of scanning element 9 to match the taper of bore 12. Metallic clamping sleeve 13 has a female thread (not shown) that is engaged by a male thread (also not shown) on shaft 9*b* of scanning element 9. Furthermore, in passage bore 12, a clamping sleeve 14 is arranged coaxially with clamping sleeve 13, which also has a male thread (not shown) which cooperates with a thread in the interior of passage bore 12. Clamping sleeve 14 is rotated by means of a tool, which can be inserted in upper part 7 of the holding device through opening 15, as clearly seen in FIG. 2. At its end opposite tip 9*a*, scanning element 9 is connected with a handwheel or set button 16, by means of which the scanning element can be turned and screwed into clamping sleeve 13. A scale 17 mounted on upper part 7 of the holding device cooperates with handwheel 16.

Uneven areas in the surface of printing cylinder 11 and deviations from a geometrically exact surface of the cylinder jacket cause motions of scanning element 9 in the direction of its longitudinal axis, that is, in the direction of the arrows E and F. Such movements cause upper part 7 of the holding device and, thus, also the engraving needle 10 to vibrate, and such vibrations have an undesirable influence on the engraving process, that is, on the depth and/or size of the surface of the screen cups cut in the printing cylinder.

In order to substantially eliminate this phenomenon, provision is made for a damping element 18, which directly acts on scanning element 9 or handwheel 16, and which has a cylindrical casing 19 in which a piston 20, shown in phantom in FIG. 1, is displaceably guided. Piston 20 is supported on a pressure spring 21 in casing 19. A tappet 22, connected to piston 20, engages with its free end a recess 23 in handwheel 16. Tappet 22 need not be connected directly with scanning element 9 or handwheel 16 as shown, but instead may be connected by way of an intermediate part. Tappet 22 is loosely engaged with recess 23, so that it is capable of performing a certain relative motion between the tappet and the scanning element or handwheel. Damping element 18 is fastened on a mounting support 24, which is separated from holding device 3 for scanning element 9 and engraving needle 10. However, mounting support 24 is also fastened on carriage 4 and displaceable together with holding device 3 in the direction indicated by the arrows C, D.

It is obvious from FIGS. 1 to 3 that movements of scanning element 9 in the direction of arrow F, that is, in the direction away from the printing cylinder 11, are completely or substantially damped out by damping element 18. Thus such movements of scanning element 9 cannot cause upper part 7 of the holding device and thus engraving needle 10 to vibrate, which vibrations could undesirably affect the engraving process.

When scanning element 9 moves in the direction indicated by arrow E, that is, in the direction towards printing cylinder 11, piston 20 and tappet 22 follow such movements of scanning element 9. By virtue of the loose connection between tappet 22 and handwheel 16 indicated above, a relative movement is possible between scanning element 9 and damping element 18, so that the motion of scanning element 9 in the direction of arrow E is not significantly hindered by the slight lag in the follow-up motion of piston 20 and the tappet 22.

However, it might be useful under certain conditions to rigidly connect tappet 22 with handwheel 16, so that scanning element 9, when moving in the direction of arrow E, carries along tappet 22 and piston 20. In this manner, the motion of scanning element 9 can be damped. Such damping effect would be intensified if pressure spring 21 is connected to piston 20.

The clamping sleeve 13 may be designed in a way other than the form shown in FIG. 1. A possible variation is shown in FIG. 4 and in German Patent No. 36 19 320.

Figure 4:
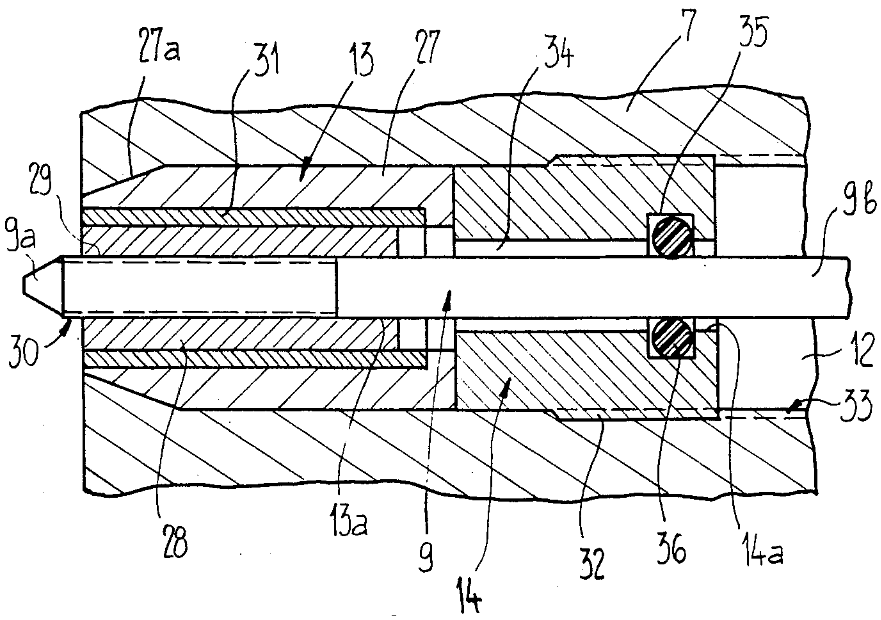
FIG. 4 is a cross-sectional view of part of the holding device of another type of mounting support for a scanning element than that shown in FIG. 1.

Sleeve 13 shown in FIG. 4, which has a passage opening 13*a* consists of two parts 27 and 28, which are connected with one another. At its end 27*a* facing tip 9*a* of scanning element 9, the outer part 27 of sleeve 13 has a conical taper. The inner part 28 of the sleeve 13 is provided with a female thread 29, which is a fine thread, into which shaft 9*b* of scanning element 9 is screwed with its male thread 30. A sleeve-like damping element 31 is arranged between the two sleeve parts 27 and 28, which damping element, on the one hand, connects the two sleeve parts 27 and 28 with one another, and separates such parts, on the other hand. This damping element 31 is composed of an elastically deformable, energy-absorbing material; preferably, it is made of an elastomer. It was found that butyl rubber is a particularly suitable material. However, it is possible to use also natural or nitrile rubber or other types of natural or synthetic rubber. Basically speaking, for damping element 31, any type of material is suitable which, on the one hand, completely or at least substantially prevents vibrations from being transmitted from scanning element 9 or sleeve part 28 to outer sleeve part 27 and thus holding device 3 or its upper part 7, and which, on the other hand, produces a sufficiently rigid connection between sleeve parts 27 and 28 that firm and exact guidance of scanning element 9 in clamping sleeve 13 is assured.

Clamping sleeve 14, which is arranged in passage bore 12 in upper part 7 of the holding device and arranged therein coaxially with clamping sleeve 13, is provided with a male thread 32, which engages with a female thread 33 on the inner side of passage bore 12. The diameter of passage bore 14*a* in clamping sleeve 14 is slightly larger than the outer diameter of shaft 9*b* of scanning element 9. In this way, an intermediate space 34 having an annular cross section is formed between scanning element 9 and the wall of passage bore 14*a*. On its inner side, clamping sleeve 14 has an annular groove 35, which extends therearound and is open towards passage bore 14*a*. A damping element 36 having the shape of an O-ring and resting against shaft 9*b* of scanning element 9 is arranged in groove 35. Damping element 36 guides scanning element 9, on the one hand, and suppresses or prevents the transmission of vibrations of scanning element 9 to clamping sleeve 14 and thus to holding device 3 or its upper part 7, on the other hand.

With the mounting device for the scanning element shown in FIG. 4, scanning element 9 is decoupled from upper part 7 of the holding device and thus also from engraving needle 10 by way of damping element 31 and damping element 36. As mentioned hereinabove, vibrations of scanning element 9 are prevented by damping elements 31 and 36 from being transmitted to outer part 27 of the sleeve or to clamping sleeve 14. Thus, this embodiment of the mounting support for scanning element 9 additionally contributes to the afore-described damping of the motions of scanning element 9 by damping element 18 in that unavoidable motions of scanning element 9 in the direction of its longitudinal axis 9' cannot interfere with the engraving of the small cups in the screen.

It is to be understood that not only clamping sleeve 13 but also damping element 18 may be designed in ways other than the embodiments shown and described herein. A few of the various possible variations are described briefly in the following.

Instead of supporting piston 20 of damping arrangement 18 on a pressure spring 21 as shown, piston 20 may conceivably be acted upon hydraulically by a fluid, that is, a liquid or gaseous pressure medium.

Also, damping element 18 may be embodied in such a way that both sides of piston 20 are acted upon by spring elements or a pressure medium. In such an embodiment, damping element 18 could exert a damping effect in the direction of pressure cylinder 11, that is, in the direction of arrow E when scanning element 9 is moving. However, this would require some type of driving connection acting between scanning element 9 or handwheel 16 and tappet 22 in both directions of movement of scanning element 9. For example, for this purpose, tappet 22 could be rigidly connected with the handwheel 16.

While only two embodiments of the present invention have been shown and described and several others mentioned, it will be obvious that many changes and modifications may be made thereunto without departing from the spirit and scope of the invention.

What is claimed is:

1. A device for engraving intaglio printing cylinders, having at least one engraving tool supported in a holding device adapted to be brought into contact with the printing cylinder to be engraved and an elongated scanning element, the improvement comprising a damping system operating on the scanning element and damping the motion thereof resulting from unevenness of the printing cylinder.

2. The device according to claim 1, wherein said scanning element having its longitudinal axis directed towards the printing cylinder and said damping system substantially acts in the direction of the longitudinal axis of the scanning element.

3. The device according to claim 1, comprising means for operatively coupling the scanning element and the damping system such that the damping system for the scanning element is effective only when the scanning element moves away from the printing cylinder to be engraved.

4. The device according to claim 1, comprising means for operatively coupling the scanning element and the damping system such that the damping system for the scanning element is effective when the scanning element moves in opposed directions.

5. The drive according to claim 1, wherein said damping system includes a piston accommodated in a casing, and a spring element acting on at least one side of said piston, said piston being connected with said scanning element.

6. The device according to claim 1, wherein said damping system includes a piston accommodated in a casing, and a pressure medium acting on at least one side of said piston, said piston being connected with said scanning element.

7. The device according to claim 1, wherein said damping system is mounted on a support separate from said holding device for the scanning element, said support and said holding device being arranged on a common carriage.

8. The device according to claim 1, wherein said damping system includes a piston accommodated in a casing and a spring element acting on at least one side of said piston, said piston being connected with an element connected with said scanning element.

9. The device according to claim 1, wherein said damping system includes a piston accommodated in a casing and a pressure medium acting on at least one side of said piston, said piston being connected with an element connected with said scanning element.

10. The device according to claim 1, wherein said damping system is mounted on a support arranged on a common carrier with said holding device.

11. The device according to claim 1, wherein said elongated scanning element is supported in a metallic sleeve which is adapted to be inserted in the holding device.

12. The device according to claim 11, wherein said sleeve is comprised of two parts interconnected with one another and separated by an element which prevents transmission of vibration from the scanning element to the holding device, said scanning element being secured in one part of said sleeve and the other part of said sleeve being supported in the holding device.

13. The device according to claim 11, wherein said scanning element is threadably engaged in said sleeve.

14. The device according to claim 13, wherein one end of said scanning element supports an adjusting element, said adjusting element being engaged by said damping system.

* * * * *